United States Patent [19]
van Mil

[11] Patent Number: 4,516,290
[45] Date of Patent: May 14, 1985

[54] APPARATUS FOR THE REMOVAL OF ENTRAILS OF SLAUGHTERED BIRDS

[75] Inventor: Martinus P. G. van Mil, Boxmeer, Netherlands

[73] Assignee: Stork PMT B.V., Netherlands

[21] Appl. No.: 493,404

[22] Filed: May 11, 1983

[30] Foreign Application Priority Data

May 17, 1982 [NL] Netherlands .................. 8202031

[51] Int. Cl.³ .................................................. A22C 21/06
[52] U.S. Cl. .................................................. 17/11; 17/12
[58] Field of Search .......................... 17/11, 12, 59, 60

[56] References Cited

U.S. PATENT DOCUMENTS

| Re. 21,983 | 12/1941 | Brodeur | 17/11 |
|---|---|---|---|
| 1,984,562 | 12/1934 | Asbby | 17/11 |
| 3,555,593 | 1/1971 | Scheier | 17/11 |
| 3,653,093 | 4/1972 | Scheier | 17/11 |
| 3,879,803 | 4/1975 | Verbakel | 17/11 |
| 3,902,221 | 9/1975 | Harben, Jr. et al. | 17/11 |
| 4,262,387 | 4/1981 | Scheier et al. | 17/11 |
| 4,293,978 | 10/1981 | McDonald | 17/12 |
| 4,308,639 | 1/1982 | Van Mil | 17/12 |
| 4,322,872 | 4/1982 | Meyn | 17/12 |
| 4,382,314 | 5/1983 | Graham | 17/11 |

FOREIGN PATENT DOCUMENTS 2301534  7/1973  Fed. Rep. of Germany .......... 17/11

Primary Examiner—Nicholas P. Godici
Assistant Examiner—Kurt Rowan
Attorney, Agent, or Firm—Newton, Hopkins & Ormsby

[57] ABSTRACT

Apparatus for removing the entrails of slaughtered birds with positioning means, an oblong spoon carrier with at its end a spoon-shaped extractor member and a head pulling bow, the movements thereof being controlled in such a manner that after the engagement of the spoon under the gizzard and lungs the movement of the bow brings about the attachment of the head together with part of the gullet, and wind pipe, attached thereto.

6 Claims, 7 Drawing Figures

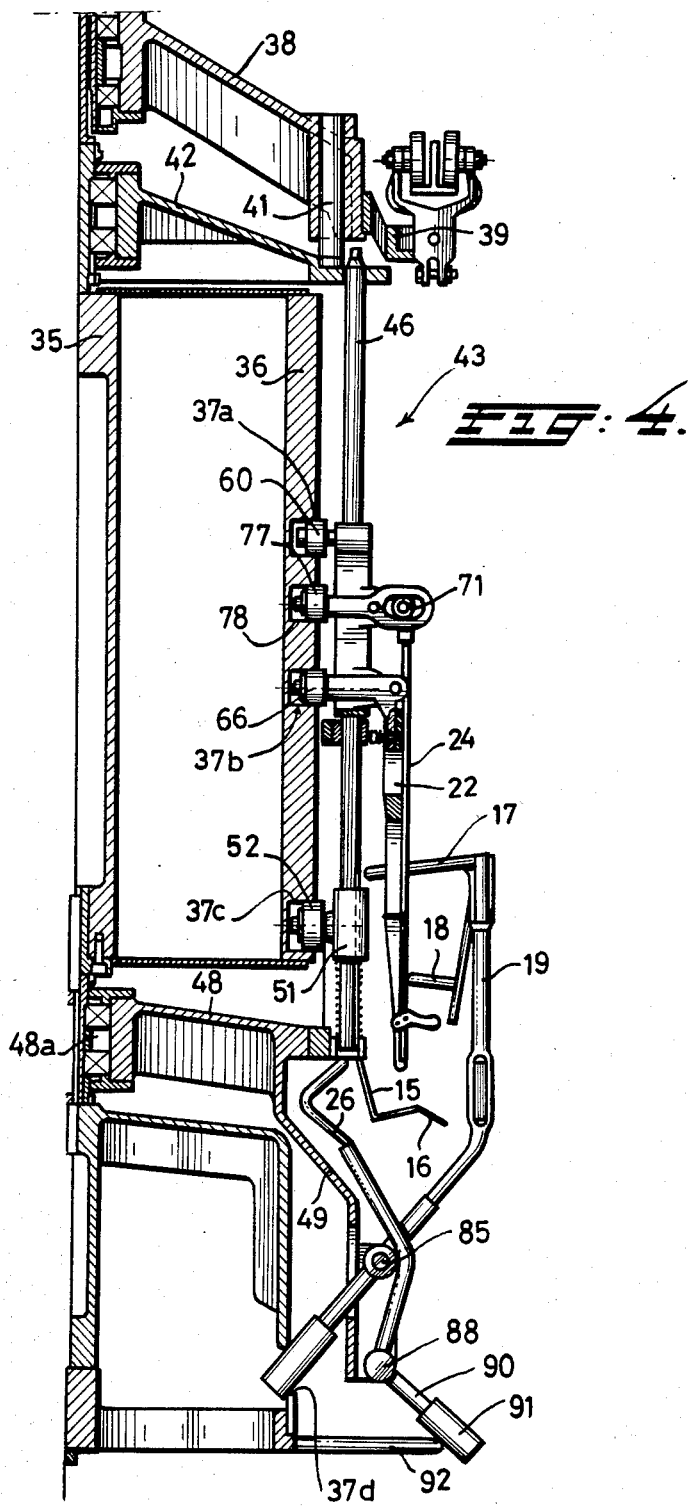

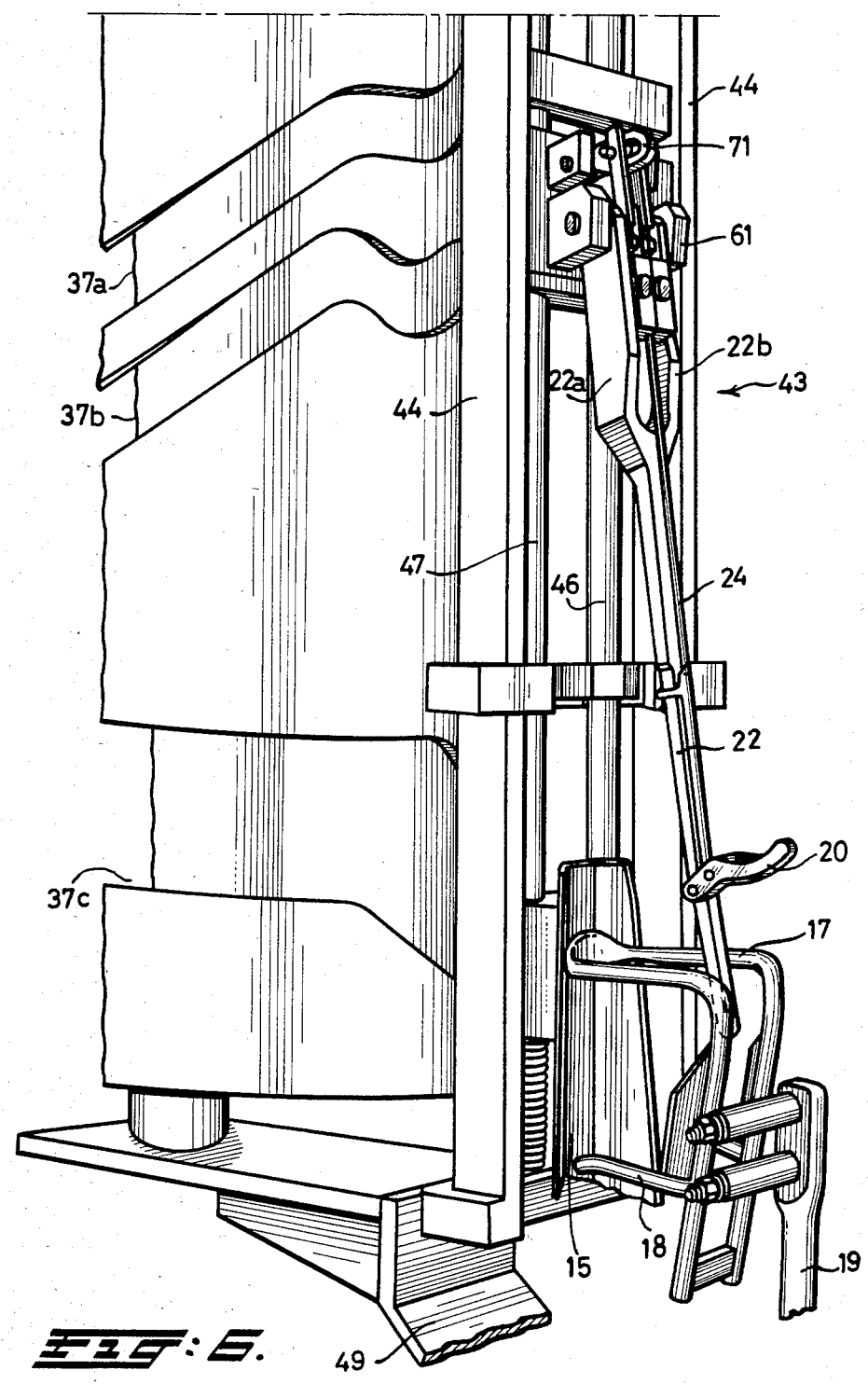

APPARATUS FOR THE REMOVAL OF ENTRAILS OF SLAUGHTERED BIRDS

BACKGROUND OF THE INVENTION

1. Field of the Invention

This invention relates to an apparatus for removing the entrails of slaughtered birds, comprising means for the positioning of the birds so that they are supported in a fixed position, and also an oblong carrier, adapted to be moved into and out of the bird and carrying at its end a spoon-shaped extractor member, which is rockable about a transverse pivot axis and is provided with a central cutout, and which after the carrier has been introduced can be pivoted to a position in which it is at an angle to the carrier so that when the carrier makes its return movement it will extract the packet of entrails.

2. Description of the Prior Art

Such apparatus are commonly known; a specific embodiment thereof is disclosed in U.S. Pat. No. 3,879,803. In these known devices the bird rests during the drawing operation on its back on a support while the spoon shaped extractor member is introduced into the body of the bird through the anal cut and describes a curved path; the front end of the spoon then rotates over about 90° in the direction of the back and during the return stroke the entrails are removed from the bird.

Before the bird is subjected to this operation the head of the bird with part of the wind pipe and gullet has been removed by means of a, commonly known apparatus. During this operation the bird hangs by its legs in the usual hooks and the force, directed away from the body, is exterted on the head: the previously cut neck is then torn off and when the distance between head and body increases gullet and wind pipe brakes off at the weakest places, the gullet in the part between the head and the crop.

In practice the place at which the wind pipe tears differs. Sometimes the wind pipe tears near to the lungs and is removed entirely, together with the gullet which has been torn between head and crop from the neck; during the subsequent drawing operation in which the complete packet of entrails is removed the lungs and the crop, hanging by a gullet part on the gizzard, are removed from the body of the bird. No entrails are then present in the body anymore.

However, the wind pipe is connected to the lungs at the place of the transition to the lungs by a small muscle while there is often, particularly in birds which are somewhat older, near to the lung some tissue between wind pipe and neck so that often the resistance, brought about by these muscles and tissue is so great that the wind pipe does not tear near to the lungs but between the tissue and the head. When then the entrails are removed the wind pipe tears again near to the lungs so that part of the wind pipe remains in the bird. This must be removed later by hand.

SUMMARY OF THE INVENTION

It is a primary object of the invention to obviate this drawback and to provide an apparatus by means of which the head of the bird as well as the complete entrails packet are removed and in which is ensured that gullet as well as wind pipe always tear at the correct positions, to wit: the gullet between head and crop and wind pipe directly at the lungs.

This aim is achieved according to the invention by a head pulling bow which is movable relative to the bird and which can be brought with its open end around the neck of the bird and can be moved back, and whose movement relative to that of the carrier and the spoon is controlled in such a manner that after the engagement of the rocked-over spoon under the gizzard and lungs the movement of the bow in the direction away from the head brings about the detachment of the head together with the gullet and wind pipe attached thereto.

The rocked-over spoon which lies under gizzard and lungs supports the gullet in the central cut-out between crop and gizzard while the front edge of the spoon presses against the muscles between wind pipe and lungs and destroy them. When then a drawing force is exerted on the head and therewith on gullet and wind pipe the wind pipe tears near to the lungs and the gullet tears between crop and head.

The complete wind pipe is removed from the bird and when the spoon is moved upwardly the complete packet of entrails, together with the crop, are taken with it.

It is clear that during the drawing of the entrails the bird must be positioned exactly. This is according to the invention obtained in that the positioning means consist of a concave support plate which receives the breast of the bird and is displaceable through the action of a spring, and which at its bottom end has two projecting support lips cooperating with two U-shaped bows which are situated above them and are adapted to move towards and away from the plate, the upper of which bows has its closed end directed towards the plate, while the lower has its open end directed towards the plate.

Positioning of the bird is thus not done in the usual way by exerting a force on the legs of the bird and restraining the body but by exerting a force by means of a spring and the supporting lips on the upper part of the body, pressing the bird upwardly against the upper bow and keeping it enclosed by the lower bow.

In a simple structure the two bows are carried by a single rocking arm adapted to turn about an axis situated at a distance from the plate.

Preferably an apparatus as described above will be combined with a number of similar apparatuses or stations to complete installations in which the stations together rotate around a central axis so that the birds during the drawing operation are moved in a circular path around this axis; thus the complete installation can easily be included in the usual conveyor path for slaughtered birds while an installation with great capacity is obtained. The necessary movements of the various elements are then brought about by means of control rollers which cooperate with suitable shaped guide path in a central control drum around which the stations move. Such a set up is known in itself.

Movements of the various elements, particular of the spoon, take in the known device place in an essentially horizontal direction which means that a complete installation, constructed as described above, has a great diameter.

According to the invention the birds are preferably introduced in the device hanging on their legs, while the movement of the spoon carrier is essentially a movement in a vertical direction. This results into a decrease of the dimensions of the installation and makes it possible to obtain a installation with a great capacity.

In such a setup the spoon is preferably pivotally coupled to an operating rod extending along the carrier and displaceable in the longitudinal direction relative thereto while the carrier is connected, by means of a pivot pin mounted on it at the opposite end to the spoon and directed transversely to the direction of movement, to a sliding member received in an oblong guide and coupled to a first control roller cooperating with a first guide path with varying level, in which member is received the pivot pin of the top end of the carrier, this end of the carrier being coupled to a second control roller, which similarly cooperates with a second guide path with varying level and which is connected to the first arm of an angled member which is adapted to turn about the pivot pin and whose second arm is coupled to the end of the carrier in a resiliently yieldable manner.

By varying the distance between the two guide paths the distance between the two control rollers varies too and the movement of the lower end of the spoon carrier is brought about in a simple way.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF THE DRAWINGS

FIG. 4 is a view of a complete apparatus according to the invention, half in longitudinal section and half in elevation;

FIG. 6 shows diagrammatically the spoon carrier and the spoon, the positioning bows, and a part of the support plate.

DESCRIPTION OF THE PREFERRED EMBODIMENTS

Figure 1:
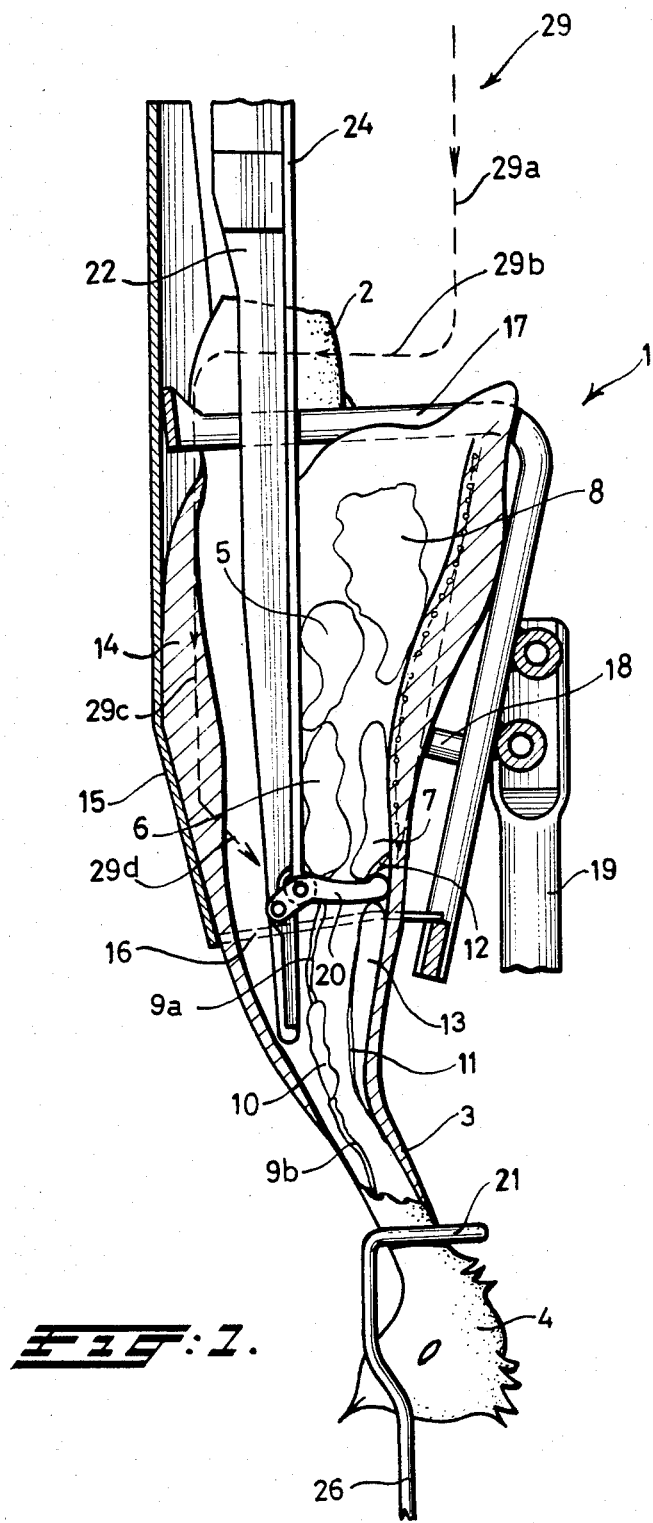
FIG. 1 shows diagrammatically, partly in section, the positioning means of the apparatus according to the invention, with the bird which is to be dressed situated therein, and with the spoon, spoon carrier and head pulling bow.
Figure 2:
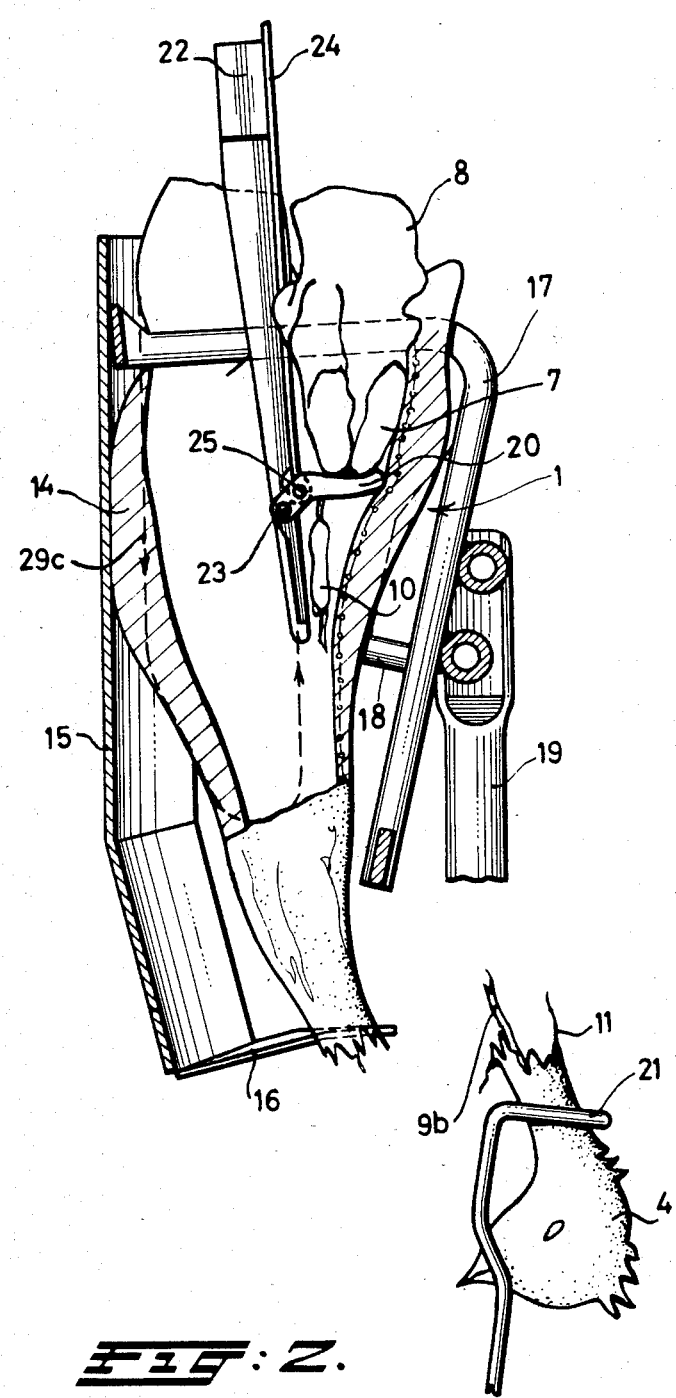
FIG. 2 shows the situation after the removal of the head, gullet and wind pipe and during the last phase of the extraction of the entrails.

In FIG. 1 the bird is indicated by the reference numeral 1; during the drawing operation this bird hangs with its legs 2 (shown only in part) in the usual suspension hook. The neck of the bird is indicated by the reference numeral 3 and its head by the reference numeral 4; for the sake of clarity the only parts of the entrails shown are the stomach 5, the gizzard 6, and the lungs 7, while the remainder of the entrails is indicated diagrammatically by the reference numeral 8.

The gizzard 6 is connected by the gullet part 9a to the crop 10, which in turn is connected by the gullet part 9b to the beak cavity; the lungs 7 are connected to the beak cavity by the wind pipe 11. The wind pipe 11 is connected by small muscles 12 to each of the lungs and usually connected by a tissue formation 13 to the neck 3.

During the drawing operation the bird rests with its breast 14 against the support plate 15, the forwardly projecting lips 16 of which embrace the neck of the bird. In addition, the bird is positioned by the spreader bow 17 and the U-shaped bow 18 situated under the latter and fastened to the bow carrier 19. Some of these members are shown only in part in the drawings.

The members with which the drawing operation is carried out are the extractor spoon 20 and the head pulling bow 21. The spoon 20 is fastened to the oblong spoon carrier 22 at the pivot point 23 lying transversely on the longitudinal axis of the spoon carrier 22; the movement of the spoon 20 is controlled by the operating rod 24, which acts on the spoon carrier 22 at the pivot point 25. The head pulling bow 21 is carried by the rocking bow 26, which will be discussed more fully below.

Figure 5A:
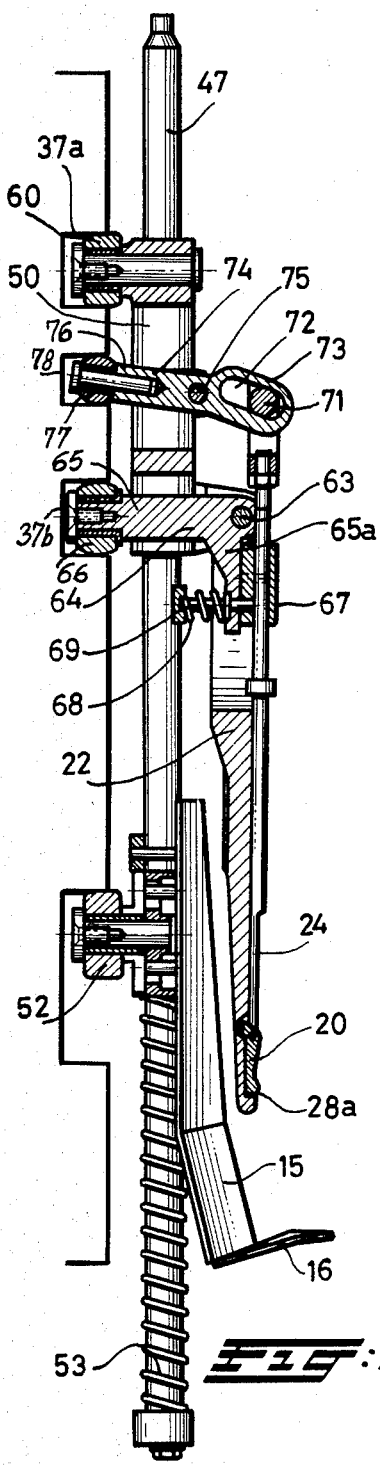
FIG. 5a is a side view, partly in section, of the spoon carrier and the support plate.
Figure 5B:
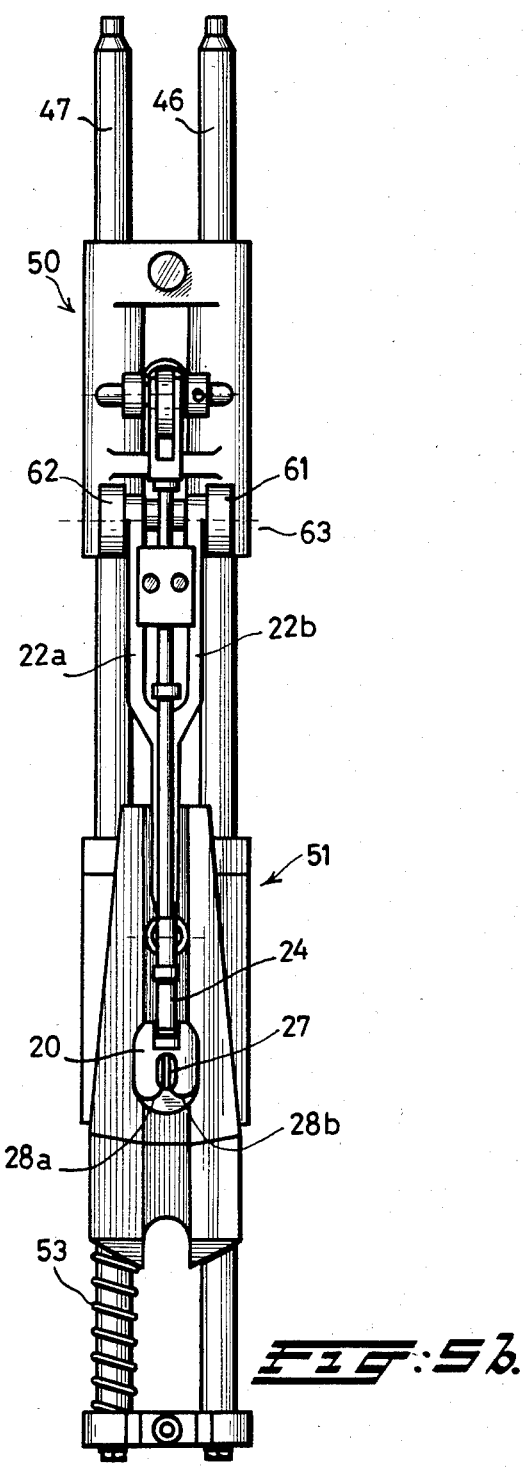
FIG. 5b is a front view of these parts.

The spoon 20 is shown in greater detail in FIGS. 5a and 5b, and, as can be seen particularly in FIG. 5b, the spoon 20 has an oblong central cutout 27, while the front edge consists of two rounded portions 28a, 28b. The function of the latter will be explained below.

The path of the end of the spoon carrier is indicated by the broken line 29.

At the beginning the spoon carrier moves vertically downwards, the pivot point 23 of the spoon travelling over the portion of the path indicated by the reference numeral 29a until the front edge of the spoon 20 has penetrated into the bird's body through the anal cut. The spoon carrier then moves to the left, the pivot point travelling over the part 29b of the path, whereupon the carrier moves vertically downwards; this part of the path is indicated by the reference numeral 29c. At the end of this movement the spoon 20 is swung over into the position shown in FIG. 1, the pivot point being at the same time moved to the right, so that the whole arrangement has assumed the position shown in FIG. 1.

In this position the gullet part 9a lies at the back of the cutout 27 in the spoon, and the front edges 28a, 28b press against the muscles which connect the wind pipe 11 to the lungs 7. They are thereby broken away. When the head pulling bow 21 is then moved to the right, the neck 3, which is already weakened by the usual cut made in the neck (not shown), is torn off the bird, the wind pipe 11 being torn off the lungs and the gullet part 9b being torn away from the crop 10. In practice it has been found that with the apparatus according to the invention the wind pipe and gullet are always torn away at the points indicated above.

When the spoon carrier 22 is now moved upwards, the entire packet of entrails comprising the gizzard, stomach, lungs, liver, heart, spleen, and crop is pulled upwards, so that all the entrails are removed from the bird.

From the description given above of the path of the most important part of the apparatus—the spoon carrier and spoon 20—in the bird, it is clear that the end of the spoon carrier 22, and thus also the pivot point 23 of the spoon 20 moves both in the vertical and in the horizontal direction, and this movement can of course be achieved in various ways. In practice, preference is given to an arrangement in which a station in which the complete drawing movement is made is combined with a number of other stations to form a complete installation, while the stations rotate together around a central axis, so that during the drawing operation the bird travels on a circular path around this axis. The apparatus can thus be incorporated in the usual transport path for slaughtered poultry, a complete installation can thus have a high capacity, and the necessary movements of the different members can be achieved with the aid of control cams cooperating with suitably shaped guide paths formed in a central control drum around which the stations move. An arrangement of this kind is customary for installations of the known kind. FIGS. 3 to 6 show details of one single station which, together with a number of other stations, forms a part of a complete installation comprising, for example, 16 or 20 stations.

This installation consists of the central shaft 35, on which is fixed a drum 36 provided with a number of guide tracks, as indicated by 37a to 37d; their operation will be described more fully below. The top bearer 38, which is rotatable about the shaft 35, is driven by the conveyor belt 39 provided with the usual suspension hooks 40, the rotary movement is transmitted via the coupling 41 to the second bearer 42, on which the various stations are fastened; between the stations coupling members (not shown) are disposed. One such station is indicated as a whole in the different FIGS. by the reference numeral 43.

The station consists of two vertical supporting beams 44, 45, between which vertical round guide rod 46 and 47 are disposed. In each station the vertical beams and guide rods are connected at the lower end to the bottom bearer 48, which by means of the bearings 48a can rotate freely about the central shaft 35. They are in addition connected to the lowermost bearer 49, the function of which will be discussed more fully further on.

On the rods 46, 47 are vertically movable a first sliding member 50 and a second sliding member 51. The construction of this second sliding member 51 is simple; it carries the control roller 52 and is acted on by the vertical coil spring 53 disposed on the guide rod 47. The sliding member 51 also carries the plate 15, which has previously been referred to and which is provided with projecting lips 16.

The roller 52 cooperates with the guide path 37c at a variable level in the stationary drum 36; in the positions of the station 43 in which the drawing operation is carried out the upper limit of the guide path 37d is so high that the sliding member 51 is freely pressed upwards through the action of the spring 53.

The sliding member 50 is of complicated construction. It carries the fixed control roller 60, which cooperates with the guide track 37a and thus limits the vertical position of the sliding member along the guide rods 46, 47. In addition, the sliding member carries the two fixed projecting flanges 61, 62 with the pivot pin 63 between them; the forked end 22a, 22b of the spoon carrier 22, which at its bottom end carries the spoon 20, is mounted for rotation around this pivot pin. Between the two prongs 22a, 22b of the forked part is mounted, likewise for rotation about the pin 63, the angled member 64, of which the first arm 65 carries the control roller 66 which cooperates with the guide path 37b, while its second arm 65a lies against the pressure plate 67 fastened on the prongs 22a, 22b. This is achieved through the action of a spring 68 disposed around the pin 69 fastened in the plate 67. This pin passes with play through the opening 60 in the arm 65a.

In this manner, the effect is achieved that the arm 65a lies under the force of a spring against the plate 67, while however the spoon carrier 22 can turn through a small angle to the left, relative to the arm 65a, against the action of the spring 68, and thus to some extent can yield resiliently.

With the construction described above, the effect is achieved that as long as the rollers 60 and 66 move in the vertical direction with the same mutual spacing (which will be the case whenever the distance between the guide paths 37a and 37b remains the same), the spoon carrier 22 will make a vertical movement, while the pivot point 23a between the spoon 20 and the spoon carrier 22 likewise makes a purely vertical movement; however, whenever the distance between the guide paths 37a and 37b changes—so that the distance between the rollers 60 and 66 changes accordingly—the angled member 64 will turn about the pin 63 and the end of the spoon carrier, and accordingly the spoon 20, will make a movement in the horizontal direction. In this way the above described movement of the spoon 20 in the horizontal direction is achieved in a simple manner; through the selection of the mutually different levels of the guide paths 37a and 37b along the periphery of the drum 36, the position of the spoon 20, both in the horizontal and in the vertical direction, is accurately determined.

The spoon drive rod 24 carries at its forked top end 24a the transverse pin 71, which is guided in the slot 72 in the end 73 of the rocking arm 74, which is adapted to turn about the pivot pin 75 in the pressure member 50; the other end 76 carries the control roller 77 which cooperates with the auxiliary guide path 78.

A movement of the control roller 77 in the vertical direction, following the guide path 78, has the consequence that the rocking arm 74 turns about its pin 75, so that the drive rod 24 is moved up and down by means of the pin 71.

In the manner described above it is possible with simple constructional means to achieve for each station in the complete installation the correct movements of the spoon 20 in the horizontal and vertical directions when the station moves around the periphery of the central control drum 26.

It is clear that during the operation of removal of its entrails the bird must be positioned very accurately. Mention has previously been made of the support plate 15 provided with the lips 16 which embrace the neck of the bird from the "breast side", of the spreader bow 17, and of the U-shaped bow 18 disposed under the latter, both these bows being fastened on the bow carrier 19. These last-mentioned members can be seen in greater detail in FIGS. 3 and 4. The bow carrier 19 can turn about the pin 85 held between the upstanding flanges 86, 87 fastened on the carrier part 49. Between these flanges 86, 87 a second pin 88 is disposed in a lower position; the combination of arms 89 and 90 is adapted to turn about this second pin, the arm 90 carrying the control roller 91 which cooperates with the guide path formed between the wheel 92 and the guide 93, while the arm 89 carries the head pulling hook 26.

Figure 3:
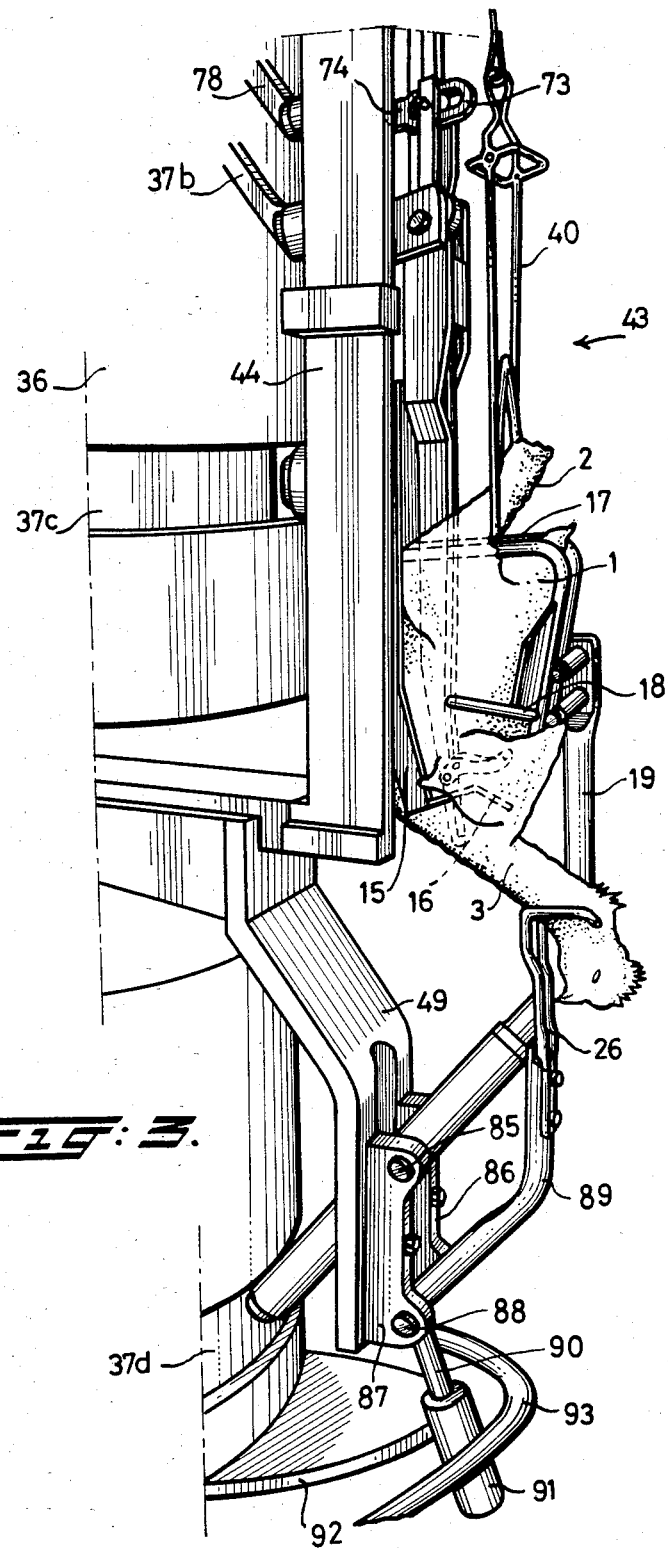
FIG. 3 shows these parts in perspective.

As can be seen in FIGS. 1 and 3, the hook 21 engages around the neck 3 of the bird, and the movements of the different dressing members are so adjusted to one another, through the correct selection of the course and the spacing of the guide paths, that when the spoon is in the position shown in FIG. 1 the arm 89 moves to the right with the head puller 21, embraces the neck, and pulls the head off the neck. Thus, as already described, not only is excellent separation of the wind pipe and the gullet achieved, but in addition a complete dressing station can be dispensed with.

The apparatus works in the following manner:

The birds, hanging by their legs from the hooks 40 and with their breasts facing the apparatus, are brought to the latter; the hooks hang on the conveyor belt 39, which over a part of the periphery of the installation, the overall configuration of which is cylindrical, is in engagement therewith. As the birds enter the apparatus, the sliding member 50 is in its uppermost position, the bow carrier 19 has been swung forwards, the plate 15 is in its lowest position, and the head puller 21 on the arm 89-26 is in the lefthand position. When the bird rests with its breast 14 against the plate 15, as the station turns further around the control drum 36, the bow carrier 19 with the bows 17 and 18 moves in the radial direction towards the shaft 35, so that the hind part of the bird is fixed in the horizontal direction between the plate 15 and the bow 18; the control roller 52 cooperating with the guide curve 37c becomes free from the upper edge of the latter and is pressed upwards by the spring 53 until the lips 16 come under the wings of the bird's body and the bird is firmly clamped between these lips 16 and the spreader bow 17. As the movement of the station continues, through the cooperation of the different control rollers with the respective guide paths the movements described with the aid of the drawings are made by the spoon carrier and the spoon, with as a result the removal of the entire packet of entrails.

Although the present invention has been shown and described in connection with a preferred embodiment thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. Apparatus for removing the heads and entrails of slaughtered birds comprising means for positioning the birds and supporting them at a fixed location with their legs arranged uppermost and their necks and heads lowermost, an oblong carrier adapted to be moved into and out of an internal cavity of each bird at the fixed location and carrying near its leading end a spoon-shaped extractor member which is rockable about a transverse pivot axis and is provided with a central cut-out, the spoon-shaped extractor member after being moved with said carrier into said cavity being adapted to pivot to a position in which it is at an angle to the carrier so that when the carrier is retracted from said cavity the spoon-shaped extractor member will extract a packet of entrails from each bird, and a head pulling bow which is swingable toward and from the neck of each bird and adapted to straddle the neck and exert a pulling force on the neck to separate the head and part of the neck from each bird together with the gullet and windpipe, and means controlling the movement of said carrier and head pulling bow in such a manner that the spoon-shaped extractor member while positioned at said angle to the carrier removes the packet of entrails from said cavity of each bird while the head pulling bow is removing the head and part of the neck from each bird with the gullet and windpipe attached, and said means for positioning the birds and supporting them at said fixed location comprising a concave support plate which receives the breast of each bird and which is biased in one direction by a spring, and the concave support plate at its bottom having two projecting support lips adapted to cooperate with two U-shaped bows disposed above the lips and being movable toward and away from the support plate, the uppermost of the two bows having a closed end toward the support plate and the lower bow having an open end toward the support plate.

2. Apparatus for removing the heads and entrails of slaughtered birds as defined in claim 1, and said oblong carrier moving longitudinally on a substantially vertical path into and out of said internal cavity of each bird, and said head pulling bow being swingable about a horizontal pivot axis and being disposed under the means for positioning the birds and supporting them at a fixed location, each bird hanging by its legs from the last-named means.

3. Apparatus for removing the heads and entrails of slaughtered birds as defined in claim 1, and an operating rod pivotally coupled with the spoon-shaped extractor member and extending longitudinally of the oblong carrier, means coupled with said operating rod to displace it longitudinally, means pivotally supporting the oblong carrier near its end away from the spoon-shaped extractor member on a pivot axis transverse to the path of movement of the carrier into and out of the internal cavity of each bird, and means to swing said carrier about said transverse pivot axis toward and away from the concave support plate.

4. Apparatus for removing the heads and entrails of slaughtered birds as defined in claim 3, and said means to swing said carrier about said transverse pivot axis including profiled guide track means and cooperative guide roller means engaged in the guide track means.

5. Apparatus for removing the heads and entrails of slaughtered birds as defined in claim 4, and said means to swing said carrier about said transverse pivot axis further including a spring biased member carrying the cooperative guide roller means, and a rocking arm having a slotted lost motion connection with said operating rod, and cooperative guide track and guide roller means connected with said rocking arm to rock the same for displacing said operating rod.

6. An apparatus for removing the heads and entrails of slaughtered birds comprising means for supporting each bird hanging by its legs at a fixed location, an elongated carrier adapted to move substantially vertically into and out of a cavity of each bird at the fixed location, guide track and follower means connected with the carrier and being operable to move the carrier downwardly and upwardly, a spoon pivotally mounted on the lower end of the carrier and being operable to extract entrails from each bird at said fixed location when swung to a position approximately perpendicular to the carrier beyond one side thereof, guide track and follower means connected with said spoon to swing the same on its pivot relative to the carrier between a retracted position longitudinally of the carrier and said approximately perpendicular entrail extracting position, a head pulling bow mounted for swinging movement in a vertical plane below said first-named means and adapted in one position to engage the neck of each bird above the hanging head thereof and to separate the head and part of the neck from each bird, means engaging and coordinating the swinging movement of the head pulling bow with the movement of the carrier whereby said spoon will extract the entrails of each bird substantially while the head and part of the neck of the bird is being removed by the head pulling bow, and said means for supporting each bird at said fixed location including a bird breast engaging and holding plate and opposing bows engaging the back of each bird and serving to stabilize it against said plate.

* * * * *